July 26, 1966   R. A. ENGLANDER   3,262,538
DIVERGING CONVEYOR

Filed June 16, 1964   3 Sheets-Sheet 1

INVENTOR
ROBERT A. ENGLANDER
BY
ATTORNEYS

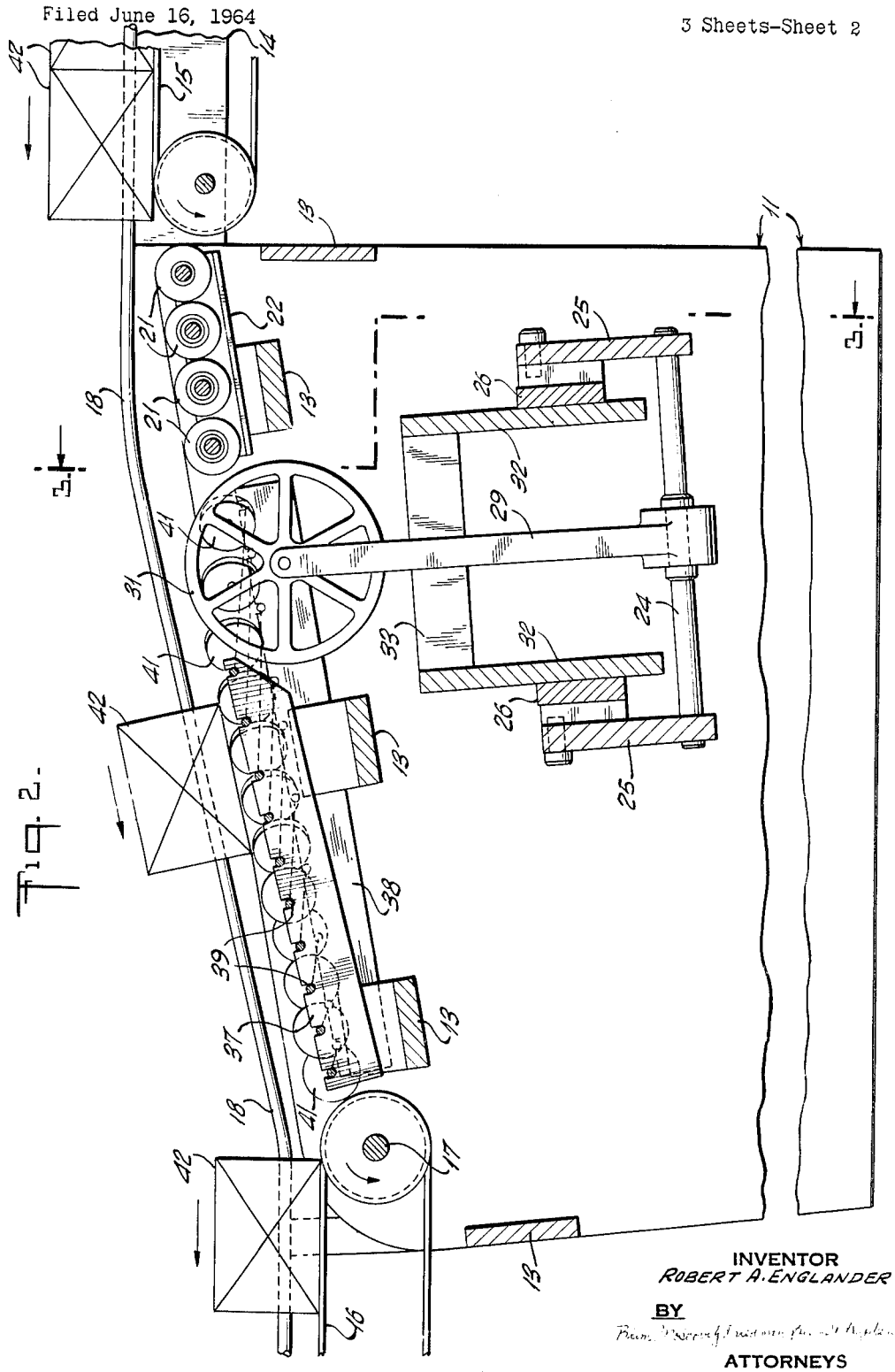

July 26, 1966
R. A. ENGLANDER
3,262,538
DIVERGING CONVEYOR
Filed June 16, 1964
3 Sheets-Sheet 3
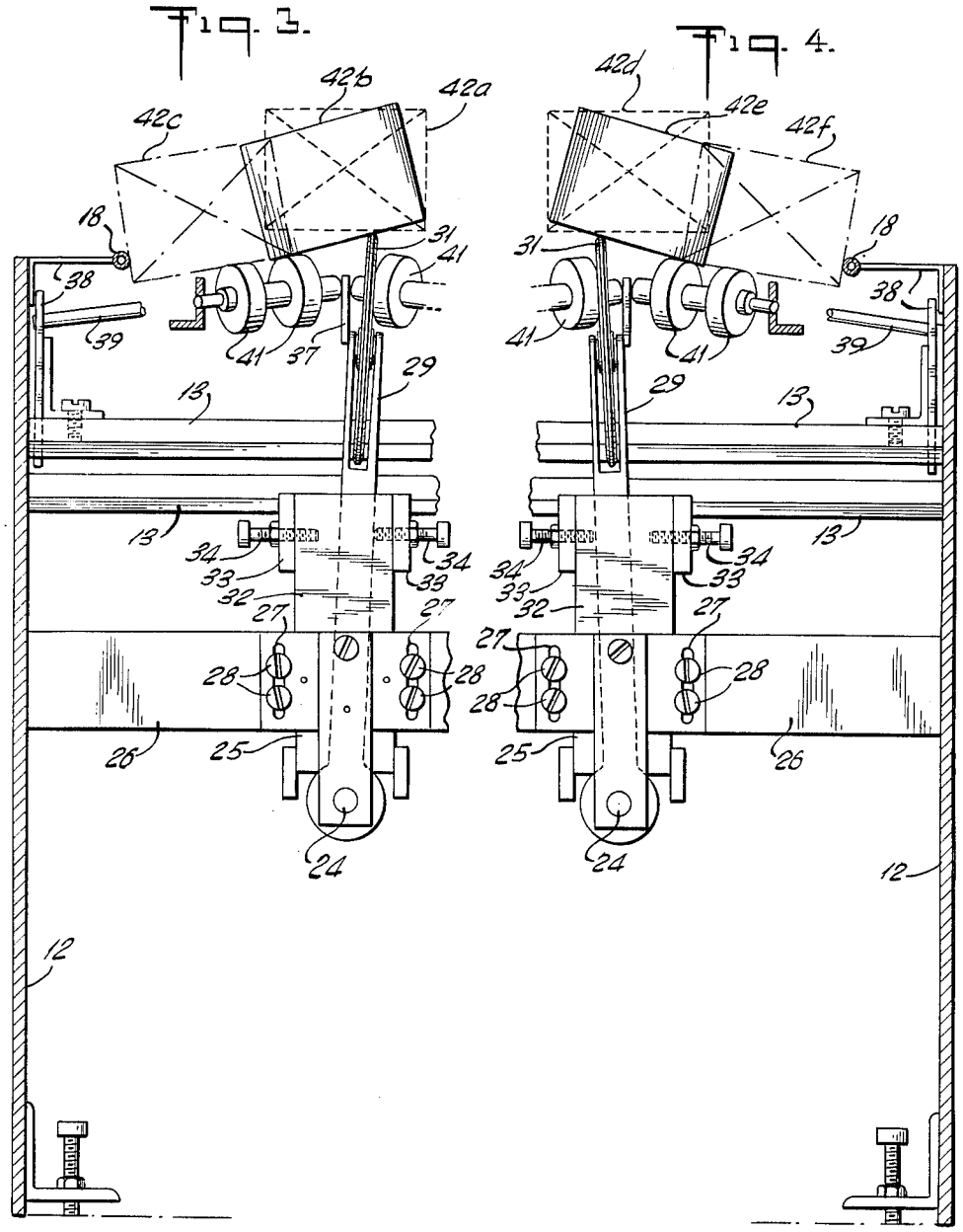
INVENTOR
ROBERT A. ENGLANDER
BY
ATTORNEYS

United States Patent Office 3,262,538
Patented July 26, 1966

3,262,538
DIVERGING CONVEYOR
Robert A. Englander, Lynchburg, Va., assignor to Simplimatic Engineering Company, Lynchburg, Va., a partnership
Filed June 16, 1964, Ser. No. 375,488
6 Claims. (Cl. 193—36)

This invention relates generally to a diverging conveyor for packages or cartons and is more specifically directed to a diverger which may be incorporated in a conveying system to divide a single row of packages traveling along a conveyor into two rows of packages traveling along separate conveyors with each consecutive package being diverted to a conveyor different than the conveyor to which the preceding package was diverted.

Diverging conveyors or divergers of this general class are known in the art. Such devices use deflecting arms mechanically or electrically operated, electrically operated shiftable wheels, rotating cams and levers operated by the diverted objects downstream of the diverging station. As may be understood, such prior art devices are relatively complex and expensive to fabricate.

Accordingly, it is a principal object of this invention to provide an improved package diverger which operates entirely on mechanical principles and which is inexpensive to fabricate and operate.

Another object of the invention is to provide an improved package diverger which utilizes the motion of a diverged package to mechanically set the diverging mechanism to oppositely diverge the package immediately following the diverged package.

Still another object of the invention is to provide a diverging conveyor having a diverging mechanism controlled and operated in response to the movement of a diverged package.

Still other objects and advantages of the invention will in part be obvious and will in part be apparent from the specification.

Generally speaking, in accordance with the invention, a package diverger receives packages and alternately diverges them onto conveyors sloping downwardly and away from the central axis of the delivering conveyor. A diverging wheel is adapted to eccentrically support the packages to effect delivery of the packages to left or right due to the off-center support thereof. The diverging wheel is shiftable between a left eccentric position and a right eccentric position and is automatically repositioned by each package as it is diverted.

The invention accordingly comprises the features of construction, combination of elements, and arrangement of parts which will be exemplified in the construction hereinafter set forth, and the scope of the invention will be indicated in the claims.

For a fuller understanding of the invention, reference is had to the following description taken in connection with the accompanying drawings, in which:

FIG. 2 is a partial sectional view taken along line 2—2 of FIG. 1;

FIG. 3 is a partial sectional view taken along line 3—3 of FIG. 2 showing the mechanism in position for diverging packages onto the left bank of conveyor wheels; and FIG. 4 is a partial sectional view similar to FIG. 3 but showing the mechanism in position for diverging packages onto the right bank of conveyor wheels.

Figure 1:
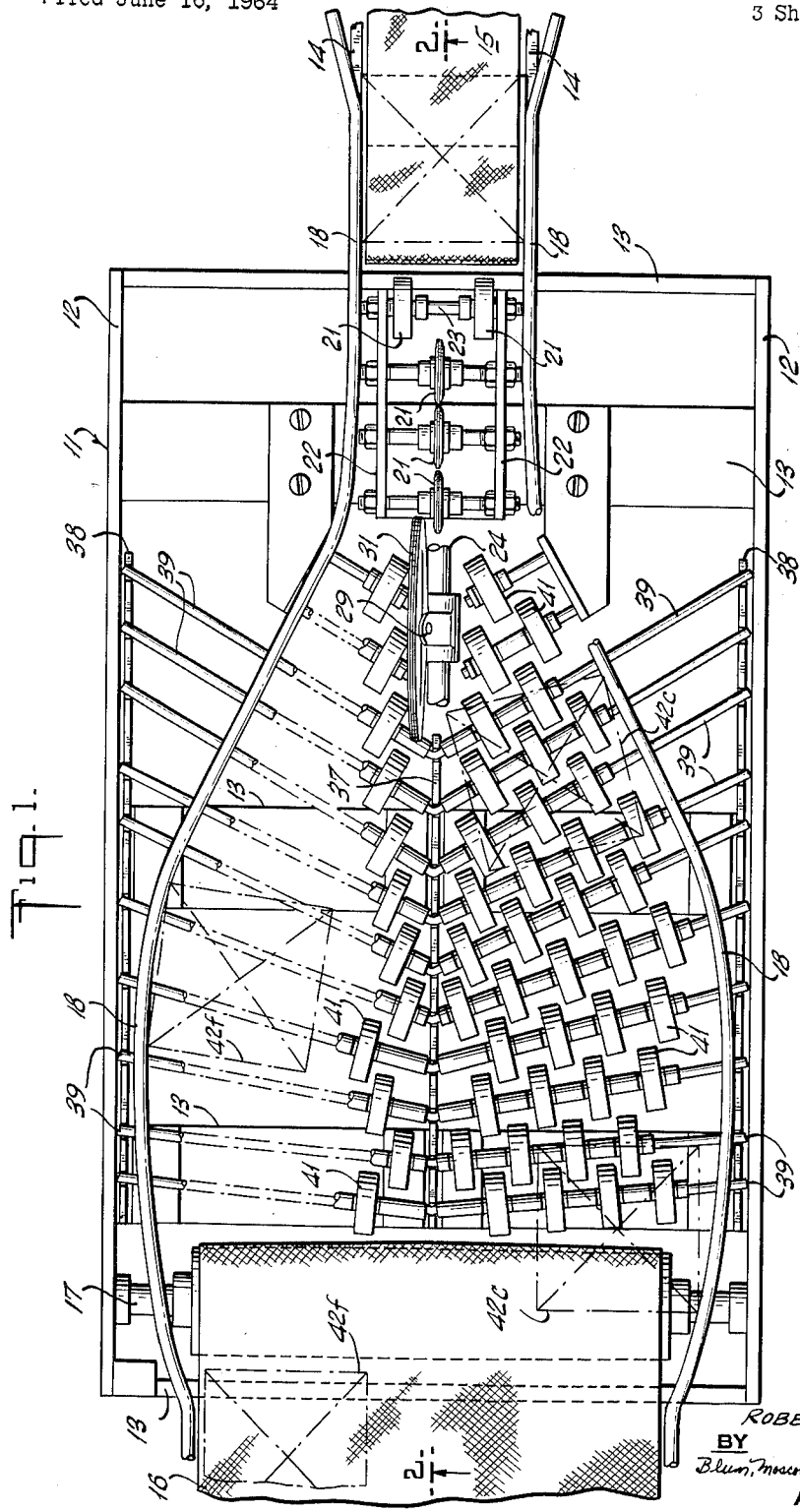
FIG. 1 is a top plan view of a diverging conveyor constructed in accordance with the invention, with certain conveying rollers being omitted for the sake of clarity and with packages being shown in phantom.

Referring now to the drawings, the diverger frame indicated generally at 11 consists of spaced plates 12 secured in spaced relation by means of cross members 13.

Support arms 14 secured to plates 12 rotatably support the delivery end of a single conveyor 15 which conveys packages to the diverger. Alternately, conveyor 15 may be independently supported with the diverging conveyor positioned to receive packages therefrom.

The delivery end of the diverging conveyor rotatably supports a double width conveyor 16 carried by a cross shaft 17 rotatably mounted in plates 12. If desired, double width conveyor 16 could be replaced by two single conveyors for greater flexibility of the downstream delivery positions. A pair of oppositely disposed flaring guide rails 18 are secured to cross members 13 and extend between single conveyor 15 and double width conveyor 16 to receive and guide packages as they travel between the two conveyors. The receiving end of the diverging conveyor is provided with a bank of receiving rollers 21 rotatably mounted in suitable spaced plates 22 supported by one of cross members 13. Closest to conveyor 15 is a pair of receiving rollers 21 on a single shaft 23. The subsequent receiving rollers in the bank consist of a single roller 21 on an associated shaft with the rollers being in alignment along the longitudinal axis of the single conveyor. As shown in FIG. 2, the conveying surface of the bank of receiving rollers is downwardly inclined so that packages may travel therealong by gravitational force.

In the vertical plane through the central longitudinal axis of the first conveyor within frame 11 is a shaft 24 rotatably mounted in spaced plates 25, the spaced plates being adjustably secured to cross members 26 which extend between side plates 12. Through elongated slots 27 and screws 28 vertical adjustment of spaced plates 25 may be accomplished. A pitman 29 is pivoted at its lower end on shaft 24. The upper end of pitman 29 carries a rotatably mounted diverging wheel 31 of relatively large diameter as compared with the diameter of receiving rollers 21. Diverging wheel 31 is mounted for rotation substantially in the vertical plane passing through the longitudinal axis of shaft 24, as will be hereafter described.

Also secured to cross members 26 are vertical arms 32 which carry cross arms 33. As best seen in FIGS. 3 and 4, pitman 29 pivots about shaft 24 to the left and right of a vertical axis. In order to adjust or control the amount of angular pivot, a bolt 34 is threadedly received through each of cross arms 34 with the end of each bolt projecting toward pitman 29. In each extreme angular position, pitman 29 engages the end of one or the other of the bolts and, by rotation of the bolts, the limit of motion of the pitman may be readily adjusted.

Downstream of the bank of receiving rollers 21, the diverger divides into left and right sets of rollers to carry packages being diverged. The banks of rollers are symmetrical on either side of the central longitudinal axis of the diverging conveyor, which axis corresponds with the central longitudinal axis of single conveyor 15. The conveying surface of each bank of rollers slopes downwardly away from the central longitudinal axis toward guide rails 18 as best shown in FIGS. 3 and 4 as well as sloping downwardly in the direction of package delivery as shown in FIG. 2. A central plate 37 and side plates 38 are supported within frame 11 by means of side plates 12, cross members 13 and other suitable supports and braces and each of the central and side plates is provided with a plurality of notches for receiving and supporting the roller shafts. A plurality of shafts 39 are mounted between central plate 37 and each of the side plates 38 and each shaft carries one or more rotatably mounted rollers 41. Note that in FIG. 1, many of rollers 41 have been omitted for the sake of clarity of illustration.

At the receiving end of the diverger, the bank of receiving rollers and the spacing of guide rails 18 is sufficiently wide to receive packages which may travel along the single conveyor. From the diverging wheel to the double width conveyor, the width of left and right banks of rollers increases from the narrowest width at the receiving rollers to maximum width at the double width conveyor. For this reason, more rollers 41 are provided at the delivery end than at the end proximate to the bank of receiving rollers. The rollers proximate to the diverging wheel roll in a direction which makes a greater angle with respect to the central longitudinal axis of the diverger than the rolling direction of the rollers proximate the double width conveyor. This permits packages to be conveyed off to either side of the diverging wheel in a divided path and subsequently delivered to the double width conveyor.

The operation of the diverger may now be described. Packages 42 travel along single conveyor 15 in the direction shown by the arrow in FIG. 2. From the momentum of a package, the package rides onto the bank of receiving rollers 21 which are inclined to utilize gravity to keep the package moving. The package then rolls onto diverging wheel 31 into the dotted position indicated by package 42a in FIG. 3. Because the periphery of diverging wheel 31 extends above the adjacent rollers, the package is supported only by the diverging wheel and the off-center support caused by the eccentric position of pitman 29 causes the package to immediately drop to the left into the position indicated by package 42b in FIG. 3. One edge of the package falls onto rollers 41 while the other edge remains on diverging wheel 31. Due to the downward and outward incline of each bank of rollers 41, package 42 continues its travel down the left bank of rollers in the position shown in FIGS. 1 and 3 as package 42c. As the package travels off to the left (FIG. 3) the friction between the periphery of diverging wheel 31 and the bottom of the package causes the pitman to be dragged from the position shown in FIG. 3 to the position shown in FIG. 4 due to the free pivot mounting of the pitman about shaft 24. In the FIG. 4 position of pitman 29, the diverger is automatically disposed to divert the next package 42d received from single conveyor 15 to the right side of the conveyor.

As before, as soon as package 42d rides onto diverging wheel 31, the eccentric support of the package causes the package to drop down onto rollers 41 of the right bank into the position 42e and subsequently to be conveyed off into the position indicated by 42f. Again, as the package is conveyed away by the downward incline of the right bank of rollers 41, the friction between diverging wheel 31 and the bottom of the package causes the pitman to be again shifted through the center to take up the FIG. 3 position. Thus, as each package leaves the diverging station, it automatically repositions the diverging wheel to the opposite side of the central axis of the conveyor so that each subsequent package will be eccentrically supported on an opposite side of the central axis so that packages will be alternately consecutively diverted.

As stated above, the angular travel of pitman 29 my be adjusted through bolts 31. The optimum amount of angular travel may vary with the particular packages being diverted. By way of example, it has been found that a ¾ inch shifting from side to side of the top edge of the diverging wheel works best for six-pack cartons of beverages. The optimum condition will vary with the size and weight of the packages.

The optimum amount of protection of diverging wheel 31 above the banks of rollers may also vary with package size and weight. This may readily be adjusted by adjusting the position of spaced plates 25 through screws 28 and elongated slots 27.

It will thus be seen that the objects set forth above, among those made apparent from the preceding description, are efficiently attained and, since certain changes may be made in the above construction without departing from the spirit and scope of the invention it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a conveyor for receiving, at a receiving end, packages traveling in a single path and alternately diverging the packages for delivery, at a delivery end, to two separate paths, the combination comprising a frame, first means defining a left conveying surface, second means defining a right conveying surface, said conveying surfaces sloping downwardly from the receiving end to the delivery end and downwardly away from the longitudinal axis of the conveyor separating said left and right conveying surfaces, and diverging means for diverting packages onto one of said conveying surfaces, said diverging means being shiftably positionable to alternately divert the packages solely by movement of a diverged package directly coacting therewith, said diverged package applying a lateral thrust to said diverging means while advancing on one of said conveying surfaces to shift said diverging means from one position to an opposite position.

2. In a conveyor for receiving, at a receiving end, packages traveling in a single path and alternately diverging the packages for delivery, at a delivery end, to two separate paths, the combination comprising a frame, first means defining a left conveying surface, second means defining a right conveying surface, said conveying surfaces sloping downwardly from the receiving end to the delivery end and downwardly away from the longitudinal axis of the conveyor separating said left and right conveying surfaces, and a diverger freely shiftably mounted within said frame proximate to the receiving end of said conveyor, said diverger extending above said left and right conveying surfaces and being shiftable to the left and right of the longitudinal axis of said conveyor, solely by movement of a diverged package directly coacting therewith, said diverged package applying a lateral thrust to said freely shiftable diverger while advancing on one of said conveying surfaces to shift said diverger from one position to an opposite position.

3. In a conveyor for receiving, at a receiving end, packages traveling in a single path and alternately diverging the packages for delivery, at a delivery end, to two separate paths, the combination comprising a frame, first means defining a left conveying surface, second means defining a right conveying surface, said conveying surfaces sloping downwardly from the receiving end to the delivery end and downwardly away from the longitudinal axis of the conveyor separating said left and right conveying surfaces, a pitman within said frame proximate to the receiving end of the conveyor, said pitman mounted for pivotal movement along an axis parallel to the longitudinal axis of the conveyor, and a diverging wheel rotatably mounted on said pitman at the upper end thereof, the periphery of said wheel extending above said left and right conveying surfaces, the axis of rotation of said wheel being transverse to the line of feed of said packages traveling in a single path, the shifting of said pitman being effected by the movement of a diverged package away from the diverging wheel.

4. The structure defined in claim 3 and further including means cooperating with said frame and engageable by said pitman for limiting the pivotal movement of said pitman to either side of the longitudinal axis of the conveyor.

5. The structure defined in claim 3 wherein the means defining a conveying surface comprises a plurality of shafts carried by said frame and extending at an angle to the longitudinal axis of the conveyor, and a plurality of rollers rotatably mounted on said shafts, each of said shafts carrying at least one roller.

6. The structure defined in claim 3 and further including a pair of spaced guide rails carried by said frame and extending above said left and right conveying surfaces for guiding packages during travel along the conveyor.

References Cited by the Examiner

UNITED STATES PATENTS

| | | | |
|---|---|---|---|
| 2,566,417 | 9/1951 | Holm | 198—31 |
| 2,873,836 | 2/1959 | Stubblefield | 198—31 |
| 3,115,961 | 12/1963 | Layton | 193—36 |

EVON C. BLUNK, *Primary Examiner.*

EDWARD A. SROKA, *Examiner.*